(12) United States Patent
Saxtorph (10) Patent No.: US 8,949,448 B1
(45) Date of Patent: Feb. 3, 2015

(54) SYSTEM AND METHOD FOR IMPROVING THE TIMESTAMP PRECISION IN A PRECISION TIME PROTOCOL (PTP) DEVICE

(75) Inventor: Jakob Saxtorph, San Jose, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 250 days.

(21) Appl. No.: 13/015,483

(22) Filed: Jan. 27, 2011

(51) Int. Cl.
G06F 15/16 (2006.01)

(52) U.S. Cl.
USPC .............................................. 709/230; 341/61

(58) Field of Classification Search
None
See application file for complete search history.

(56) References Cited

U.S. PATENT DOCUMENTS

| | | | |
|---|---|---|---|
| 6,970,013 B1 * | 11/2005 | Cory | 326/38 |
| 7,064,685 B1 * | 6/2006 | Xue et al. | 341/61 |
| 7,151,470 B1 * | 12/2006 | Xue et al. | 341/61 |
| 7,187,741 B2 | 3/2007 | Pontius et al. | |
| 7,447,931 B1 * | 11/2008 | Rischar et al. | 713/400 |
| 7,457,389 B2 | 11/2008 | Alderrou et al. | |
| 7,532,135 B1 | 5/2009 | Diab | |
| 7,657,668 B2 * | 2/2010 | Escott | 710/29 |
| 7,983,374 B2 * | 7/2011 | Lei et al. | 375/371 |
| 2008/0043276 A1 * | 2/2008 | Escott | 358/1.15 |
| 2009/0086847 A1 | 4/2009 | Lei et al. | |
| 2009/0147896 A1 | 6/2009 | Frankel et al. | |
| 2010/0185926 A1 | 7/2010 | Lawson et al. | |
| 2012/0082156 A1 * | 4/2012 | Swartzentruber et al. | 370/389 |

OTHER PUBLICATIONS

John C. Eidson and John Tengdin, "IEEE-1588 Standard for a Precision Clock Synchronization Protocol for Networked Measurement and Control Systems and Applications to the Power Industry" Published by Systems and Solutions Laboratory, Agilent Technologies, Palo Alto California, 2003.

* cited by examiner

*Primary Examiner* — Jason K. Gee
*Assistant Examiner* — Maung Lwin
(74) *Attorney, Agent, or Firm* — Kenneth Glass; Molly Sauter; Glass & Associates (57) ABSTRACT

In accordance with the present invention is provided a system and method for improving a timestamp precision in a precision timestamp protocol (PTP) device. The present invention provides for dynamic adjustment of otherwise uncertainty of the latency of a connection between two devices connected together through a gearbox and/or a block sync circuit. The dynamic adjustment is accomplished by identifying the alignment of data within the gearbox and block sync and adjusting the timestamp assigned to the data based upon the identified alignment to remove the jitter associated with the gearbox and the block sync, thereby improving the timestamp precision in the PTP device. In a particular embodiment, the invention is employed in a serial-deserializer (SERDES) device.

16 Claims, 7 Drawing Sheets

SYSTEM AND METHOD FOR IMPROVING THE TIMESTAMP PRECISION IN A PRECISION TIME PROTOCOL (PTP) DEVICE

BACKGROUND

The present invention relates to circuitry for improving the timestamp precision in a device utilizing IEEE 1588 precision time protocol (PTP) synchronization.

IEEE 1588 provides a standard protocol for synchronizing the clocks of multiple devices that are connected via a network, such as Ethernet. IEEE 1588 is designed to provide synchronization among networked clocks which minimizes network bandwidth overhead, processing power, and administrative overhead. IEEE 1588 provides improved device synchronization through a protocol known as the precision time protocol, or PTP. PTP technology is commonly employed in Ethernet systems, wireless network routers, fiber optic communication systems and storage applications.

In communications systems, utilizing IEEE 1588 precision time protocol (PTP), a packet-based time synchronization method is defined that provides frequency, phase and time-of-day information with sub-microsecond accuracy. PTP relies on the use of carefully timestamped packets to synchronize one or more slave clocks to a master clock. With a PTP system it is necessary to measure the latency of the link between devices on a network based upon the timestamped packets. The latency measurement is an indicator of the delay that a data packet experiences while being transmitted between the network devices. The level of precision achievable using the PTP protocol depends on the variation in latency (jitter) that exists in the underlying network topology. A desired precision exists for the system latency, however the latency experienced between transmitted data packets is not always constant. Variation in the delay of data packets transmitted through the network is commonly referred to as "jitter". Jitter within a PTP system is undesirable and as such, it is advantageous to eliminate or minimize the unwanted jitter, thereby improving the network system's timestamp precision.

Jitter results from the uncertainty of the latency between two devices that are operably coupled to one another through a data bus. The devices may be part of a single integrated circuit (IC) or may be embodied in separate ICs. Additionally, the devices may be constructed within a single IC with other devices so that the IC provides a complete system-on-a-chip (SoC) solution. For the devices of the system to communicate with one another, it is often necessary to adjust the operating frequency and data width of the data that is transmitted between the various devices on the network to allow for communication among devices that may require different data input widths. Circuitry for adjusting the width of the data transmission is known in the art, and is commonly referred to as a "gearbox". A gearbox functions to change the data width from the input of the gearbox to the output of the gearbox. A typical gearbox includes a plurality of registers and a plurality of multiplexers operable to output data at a different width than the received input data. A gearbox may include both a transmitter gearbox and a receiver gearbox.

In a transmitter gearbox, where a larger data width must be converted to a smaller data width, the data is typically read into the gearbox as "blocks" of data having the larger data width. After a sufficient number of blocks of data have been buffered into the registers, a first portion of the first block, with the number of bits in the portion being equal to the smaller data width, is read out from the transmitter gearbox. Next, a second portion of the first block, with the number of bits in the next portion begin equal to the smaller data width, is read out. If an inadequate number of bits remain in the first block to total the smaller data width, bits are read from a first portion of a second data block to total the smaller data width. This process continues until an integral number of blocks have been read and then the process repeats.

In a receiver gearbox, where a smaller data width must be converted to a larger data width, the data is read into the gearbox as blocks of data having the smaller data width. After a sufficient number of blocks of data have been buffered into the registers, all or a portion of each of the buffered blocks are concatenated and read out to equal the number of bits to make up the larger data width. The remaining portion of data in the last block read is then shifted through the registers and additional data is read into the gearbox registers at the smaller data width. This continues until an integral number of blocks have been read out and then the process repeats.

Utilizing a gearbox for data conversion from one data width to another data width within the network system introduces jitter into the data path because the time required to process data through the gearbox is not the same for every data packet. As such, the variation in the delay, or latency, of data packets transmitted through the gearbox causes undesirable jitter in the system. It is desirable to eliminate or minimize this variation and thereby improve the timestamp precision of the PTP system.

In light of the above, a need exists for a system and method to improve the timestamp precision in a PTP device or system. A further need exists for minimizing the jitter resulting from a gearbox employed in a PTP system.

SUMMARY OF INVENTION

The present invention relates to circuitry for the dynamic adjustment of a timestamp value assigned to a data packet that is transmitted utilizing precision timestamp protocol (PTP) technology in a device. Utilizing an internal delay monitor coupled to a gearbox of the PTP device, dynamic adjustment of the timestamp value is possible, which will minimize the variation in the latency measurement and improve the timestamp precision in the PTP device.

In accordance with the present invention, there is provided, a method for improving a timestamp precision in a PTP device. In the method of the present invention, input data having a first data width is received at a gearbox. The input data is then processed by the gearbox to convert the input data to output data having a second data width different than the first data width. The inventive method includes identifying an alignment of the received input data relative to the output data within the gearbox. By identifying the alignment, the internal delay of the output data relative to the input data can be determined. The alignment is then used to assign a timestamp adjustment value and the timestamp adjustment value is used to adjust the timestamp associated with the output data. Adjusting the timestamp by the identified timestamp adjustment value removes the jitter resulting from the gearbox and improves the timestamp precision in the PTP device.

In accordance with the present invention the gearbox of the PTP device receives input data at a first data rate and converts the input data to output data at a second data rate that is different than the first data rate and the ratio of the second data rate to the first data rate is substantially equal to a ratio of the first data width to the second data width. The second data width may be wider or narrower than the first data width.

In addition to removing the jitter resulting from the gearbox of the PTP device, the method of the present invention may also be used to remove the jitter resulting from the block sync circuit of the PTP device utilizing a similar procedure. In the receive direction, the output data from the gearbox is unaligned output data. By identifying the alignment of the unaligned output when the unaligned output data is received at the block sync circuit, an alignment adjustment value can be identified and the timestamp can be adjusted by the alignment adjustment value to improve the timestamp precision in the PTP device.

A system in accordance with the present invention to improve a timestamp precision in a PTP device, includes a gearbox for receiving input data at a first data width and for transmitting output data at a second data width, the second data width different than the first data width and a internal delay monitor coupled to the gearbox, the internal delay monitor comprising circuitry for identifying an alignment of the received input data relative to the output data within the gearbox, for assigning a timestamp adjustment value to the identified alignment and for adjusting a timestamp associated with the output data based upon the assigned timestamp adjustment value to improve the timestamp precision in the PTP device. The timestamp adjustment value is applicable for removing the jitter from the gearbox in both the transmit direction and receive direction.

In the receive direction, where the output data from the gearbox is unaligned output data, the internal delay monitor in accordance with the present invention further comprises circuitry for identifying an alignment of the unaligned output data when the unaligned output data enters a block sync circuit, the block sync circuit to align the unaligned output data, for assigning an alignment adjustment value to the identified alignment of the unaligned output data and for adjusting the timestamp based upon the assigned alignment adjustment value to improve the timestamp precision in the PTP device.

In a particular embodiment, the system and method of the present invention can be incorporated into a serial-deserializer (SERDES) device.

In general, the present invention provides a system and method to improve the timestamp precision in a PTP device by minimizing the jitter resulting from a gearbox and a sync block circuit employed in the PTP device. The present invention monitors the internal delay of the gearbox and sync block circuit by identifying the alignment of the output data from the gearbox relative to the input data to the gearbox. The identified alignment is then used to adjust the timestamp of the output data, thereby improving the timestamp precision of the device.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings.

DETAILED DESCRIPTION

A gearbox is utilized in communications systems when it is necessary to change the width of a parallel data transmission stream from one width to another width. Gearbox technology is commonly employed in Gigabit Ethernet systems, wireless network routers, fiber optic communication systems and storage applications. A gearbox employed for data conversion from one data width to another data width introduces jitter into the data path because the time required to process data through the gearbox is not the same for every data packet. The variation in the delay of data packets transmitted through the gearbox causes undesirable jitter in the system.

While it is generally known to utilize a gearbox for parallel data conversion from one data width to another data width, in a particular embodiment of the present invention, the gearbox is incorporated into a system employing high-speed serializer-deserializer (SERDES) technology. However, the exemplary embodiment of the present invention is not meant to be limiting and the novel features of the gearbox of the present invention may also be incorporated into various systems that do not employ SERDES technology.

High-speed parallel data transmission has become increasingly popular in communication systems and the demand for increased bandwidth in such systems has led to the development gearbox circuitry that is incorporated into high-speed serializer-deserializer (SERDES) technology that is used to support line speeds of 10 Gbaud and higher. SERDES technology is commonly implemented as an integrated circuit that converts parallel data to serial data and vice-versa for use in such high-speed implementations. The transmitter section of SERDES is a parallel-to-serial converter and the receiver section is a serial-to-parallel converter. Multiple SERDES interfaces are often housed in a single integrated circuit package. SERDES interfaces facilitate the transmission of parallel data between two points over a serial stream, thereby reducing the number of necessary data paths and thus the number of connections required on the integrated circuit.

Figure 1:
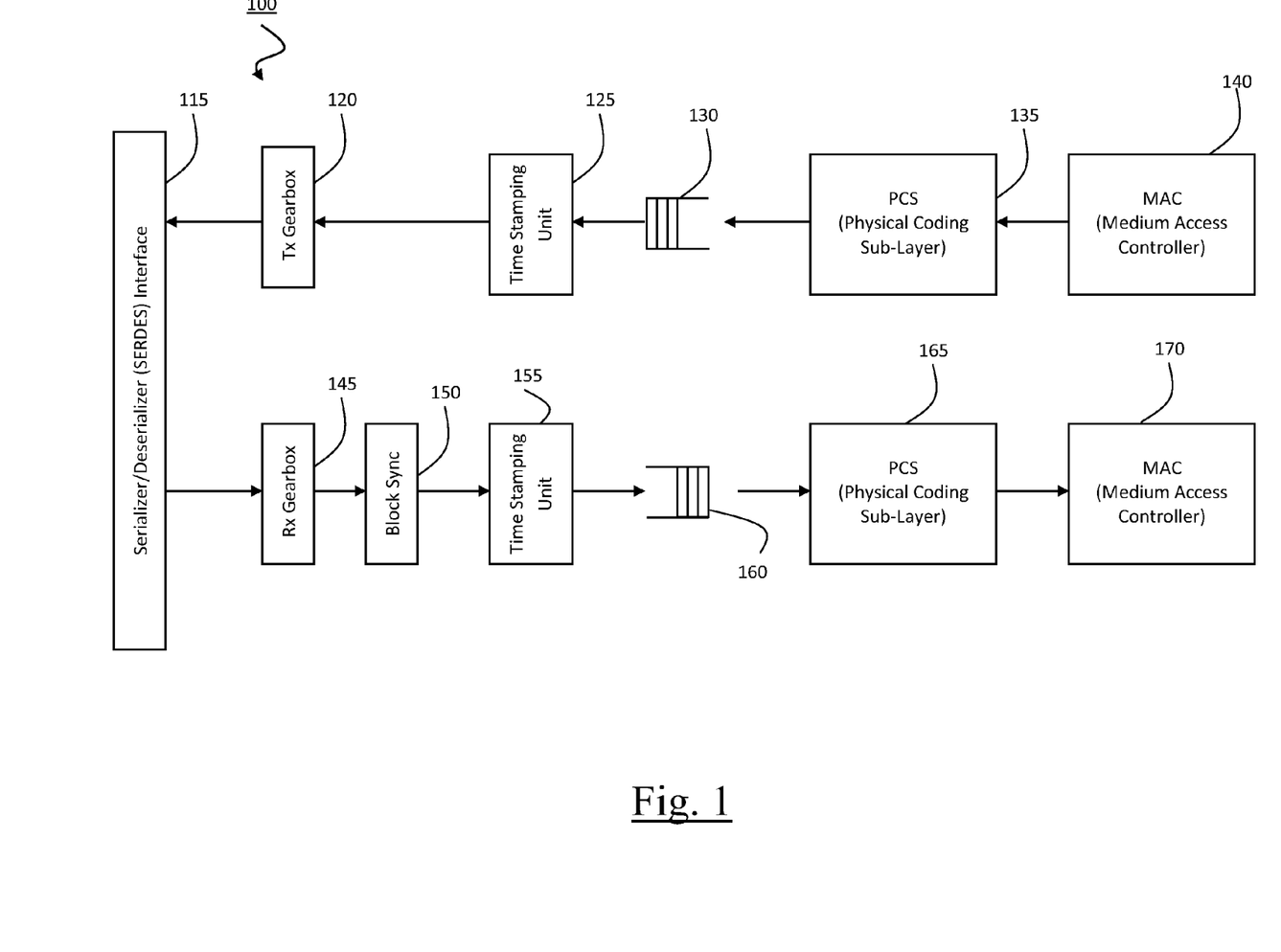
FIG. 1 is a block diagram of a serializer-deserializer (SERDES) system in accordance with an embodiment of the present invention.

With reference to FIG. 1 is illustrated a network system 100 in accordance with an exemplary embodiment of the present invention wherein the connection between devices is provided via a serial link using serializer-deserializer (SERDES) 115 technology. In the transmit direction, parallel input data to be serialized and transmitted through the SERDES interface 115 is transferred from the Medium Access Controller (MAC) 140 to the Physical Coding Sub-Layer (PCS) 135. The parallel data passes through Clock Domain Crossing (CDC) circuitry 130, such as a plurality of first-in/first-out (FIFO) devices. Other domain clocking techniques known in the art are within the scope of the present invention. The parallel input data is assigned a timestamp by the time stamping unit 125. The timestamped parallel input data is then received as input to the transmit gearbox 120. The transmit gearbox 120 receives the timestamped parallel input data and changes the bus width of the parallel input data to a bus width that is compatible with the SERDES circuitry 115 and outputs the parallel output data to the SERDES circuitry 115. The input data to the transmit gearbox 120 and the output data from the transmit gearbox 120 have different bus widths, but the same bandwidth is maintained between the parallel input data to the Clock Domain Crossing (CDC) circuitry 130 and the parallel output data from the transmit gearbox 120. After the parallel output data is received at the SERDES circuitry 115, the parallel output data is serialized and transmitted on a serial link. In the receive direction, data from the serial link is deserialized by the SERDES circuit 115 and the parallel input data is transmitted to the receive gearbox 145. The receive gearbox 145 receives the parallel input data and changes the bus width of the parallel input data to a bus width that is compatible with the PCS 165. The input data to the receive gearbox 145 and the output data from the receive gearbox 145 have different bus widths, but the same bandwidth is maintained between the parallel input data to the receive gearbox 145 and the parallel output data from the Clock Domain Crossing (CDC) circuitry 160. The parallel output data is then transmitted to a block sync circuit 150. As is well known in the art in connection with high-speed serial interfaces such as SERDES, although the receive gearbox 145 converts the parallel data received from the SERDES circuit 115 to a desired data width, the beginning and end of each "word" within the parallel output data from the receive gearbox 145 is unknown and how the blocks of parallel data are grouped by the receive gearbox 145 is arbitrary. Accordingly, it is necessary to send the unaligned parallel output data from the receive gearbox 145 through a block sync circuit 150 to establish the proper alignment. The block sync circuit 150 receives the unaligned parallel output data from the receive gearbox 145 and outputs aligned parallel output data. The block sync circuit 150 uses well known data alignment techniques to identify markers in the unaligned parallel output data which then allows the data to be aligned. The aligned parallel output data is then sent from the block sync circuit 150, through time stamping unit 155, through Clock Domain Crossing (CDC) circuitry 160 and then on to the PCS 165 and MAC 170 of the network system.

Figure 2:
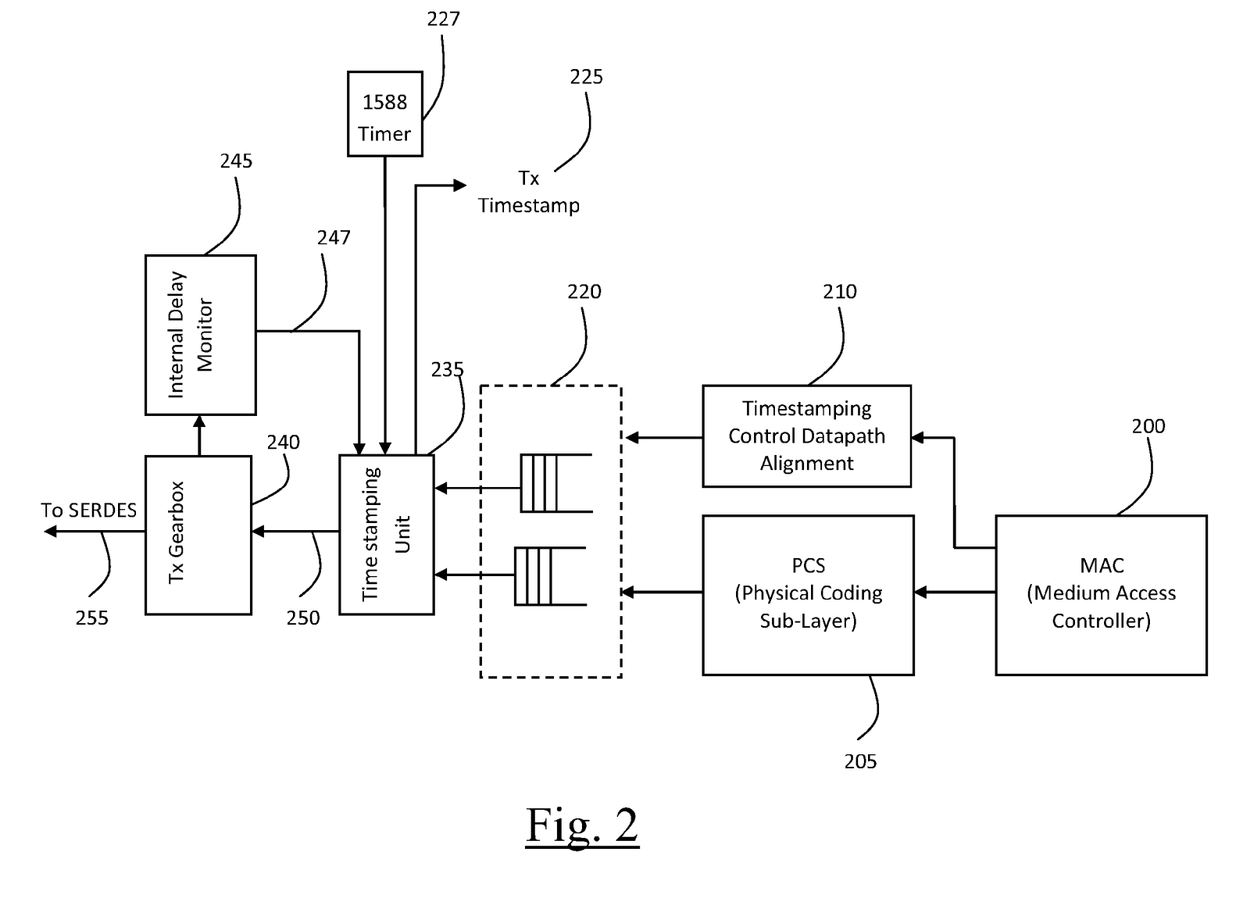
FIG. 2 is a block diagram of a transmit gearbox in a SERDES system, in accordance with an embodiment of the present invention.

With reference to FIG. 2, in a particular embodiment of the present invention for transmitting data to the SERDES interface, the function of the transmit gearbox 240 is to convert 66-bit wide data 250 to 20-bit wide data 255 for transmission to the SERDES interface. The width of the parallel data is exemplary in nature and is not meant to limit the scope of the invention. Various other data widths are within the scope of the present invention. In this embodiment, a timestamping control datapath alignment circuit 210 is used to identify the timestamp alignment for data received from the MAC 200 as is commonly known in the art. The 66-bit wide input data from the PCS 205 and the timestamp alignment data from the Timestamping Control Datapath Alignment circuit 210 are received at a Clock Domain Crossing (CDC) circuit 220 and then transmitted to a timestamping unit 235. The 66-bit wide input data is then assigned a timestamp value at the timestamping unit 235 and the timestamp value 225 is recorded by the system. In this embodiment, the timestamping unit 235 is clocked by a 1588 timer 227. The timestamped 66-bit wide input data 250 is then received as input data 250 at the gearbox 240. The gearbox 240 process the 66-bit wide input data and provides 20-bit wide output data 255 to the SERDES interface.

Figure 3:
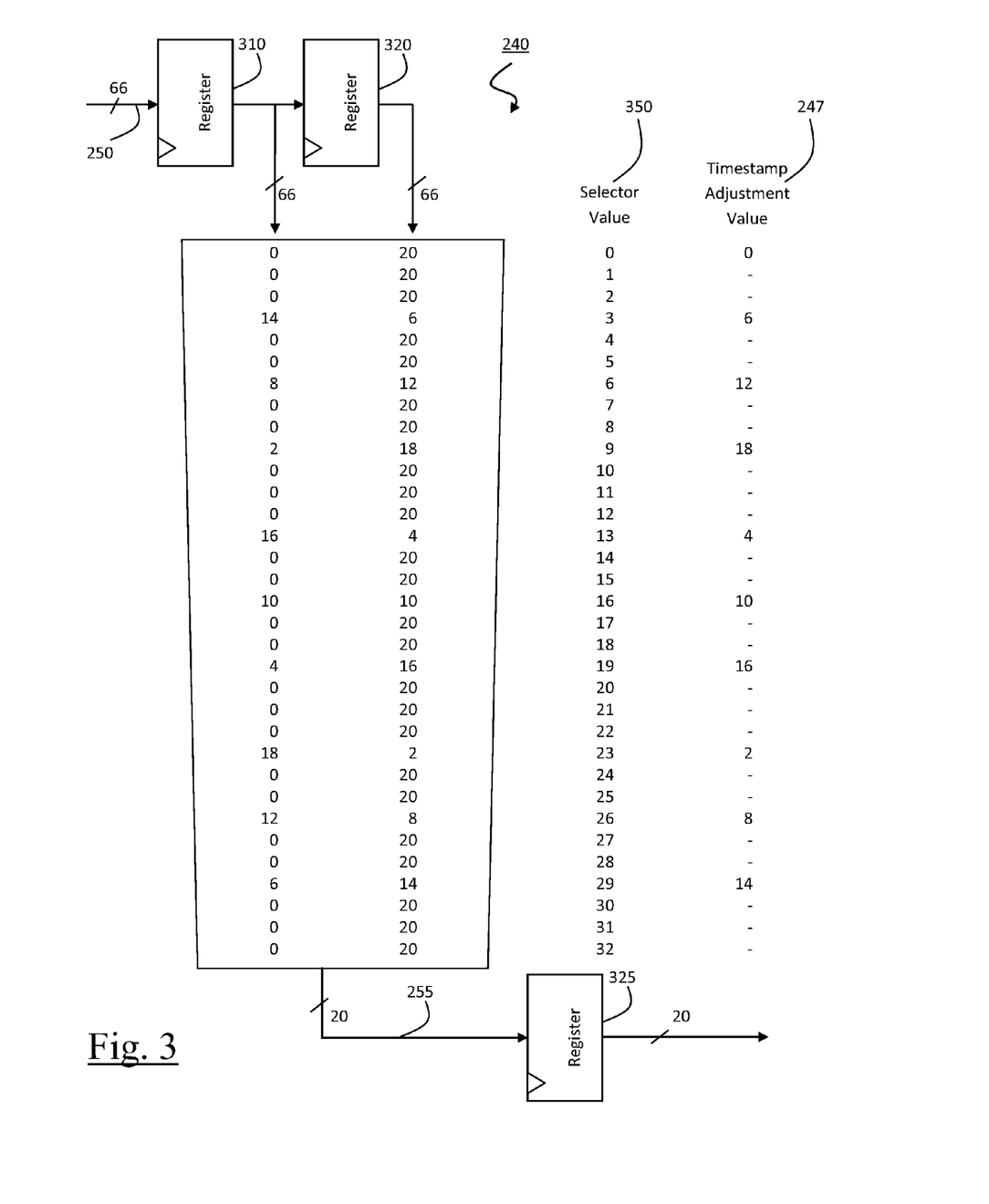
FIG. 3 is a block diagram illustrating the flow of data in a transmit gearbox, in accordance with an embodiment of the present invention.

In an exemplary embodiment, the internal operation of the gearbox 240 in the transmit direction, where the input data 250 to the gearbox 240 is sixty-six bits wide and the desired output data 255 from the gearbox 240 is twenty bits wide is illustrated with reference to FIG. 3. As shown in FIG. 3, the 66-bit wide input data 250 sequentially fills registers 310 and 320 of the transmit gearbox 240. At the output, 20-bit output data blocks 255 are read out from the transmit gearbox 240.

The output data blocks 255 are transmitted through register 325 of the transmit gearbox 240 and then to the SERDES interface. Thus, in a first cycle, sixty-six bits are available from register 320 and as such, three 20-bit blocks can be read from register 320. After sixty of the sixty-six bits in register 320 have been read out as three 20-bit blocks, six bits still remain in register 320. At this point, there are not enough bits remaining in register 320 to form another 20-bit block, as a result, fourteen bits must be read out from register 310 and concatenated with the remaining six bits in register 320 to form the next 20-bit block. After the fourteen bits have been read from register 310, there are fifty-two bits remaining in register 310. These fifty-two bits are then shifted to register 320 and register 310 is then repopulated with sixty-six bits. Forty bits are then read out from register 320 to form two more 20-bit blocks, leaving a remainder of twelve bits in register 320. The twelve bits remaining in register 320 are then concatenated with eight bits in register 310 to form the next 20-bit block. As shown in FIG. 3, this process continues until a complete block can be formed entirely from register 320 with no remaining bits, and then the process repeats.

As shown in FIG. 2, in accordance with the Precision Time Protocol (PTP) the timestamping unit 235 assigns a timestamp to each of the blocks of 66-bit input data that enter the transmit gearbox 240. Latency is inherently introduced by the transmit gearbox 240. However, due to the internal operations of the transmit gearbox 240, the latency introduced during the formation of the 20-bit output data from the 66-bit input data is not the same for every 66-bit block. In other words, the amount of time required for the transmit gearbox 240 to produce each 20-bit output data blocks differs depending upon where in the 66-bit input block the 20-bit output data block is aligned. In this exemplary embodiment, wherein the transmit gearbox 240 takes in 66 bits from the PCS 405 and delivers 20 bits to the SERDES, the transmit gearbox 240 will take in ten 66-bit blocks for every thirty-three 20-bit blocks coming out. As such, there will be ten different possible alignments of the first bit of the 66-bit input data within the 20-bit output data delivered to the SERDES, which equates to ten different latencies generated by the transmit gearbox 240 from the time the 20-bit output data is delivered to the SERDES interface until the first bit of the 66-bit serial code word is transmitted on the serial link. The difference in latency for each of the various 66-bit input data blocks affects the precision of the timestamp. Knowing the alignment of the 20-bit output data relative to the 66-bit input data will allow a timestamp adjustment value to be determined for each of the 66-bit input data blocks. This timestamp adjustment value can then be used to adjust the timestamp of the 66-bit input data block and the transmission timestamp 225 that will be sent to the system processor. These ten different latencies through the transmit gearbox 240 result in undesirable jitter in the system. The method of the present invention for dynamically adjusting the timestamp for the input data reduces the jitter introduced by the gearbox 240 into the system.

In accordance with the present invention, an internal delay monitor 245 is used to monitor the transmit gearbox 240 and to identify the alignment of the 20-bit output data blocks within the 66-bit input data block and to assign a timestamp adjustment value 247 to the identified alignment. The timestamp adjustment value 247 is then transmitted to the timestamping unit 235 to allow for the dynamic adjustment of the timestamp 225 of the input data 250. The dynamically adjusted timestamp 225 is then communicated to a processor in accordance with the Precision Time Protocol (PTP). The internal delay monitor 245 may be incorporated into the circuitry of the transmit gearbox 240, or may be circuitry separate from, but in communication with, the transmit gearbox 240.

In the exemplary embodiment illustrated in FIG. 3, the first 66-bit input data block 250 is assigned a timestamp adjustment value of zero because the alignment of the 20-bit output data 255 relative to the first 66-bit input data block 250 is the earliest possible alignment in the block and is therefore assigned a timestamp adjustment value of zero. The fourth 20-bit output data block 255 results from the six remaining bits in register 320 and fourteen bits from register 310. As a result, the second 66-bit input block 250 is assigned a timestamp adjustment value of six based upon the alignment of this 20-bit output data block within the first 66-bit input data block. Since the assignment of the timestamp adjustment values is associated with the 66-bit input block 250, only the timestamp adjustment values associated with the selector values of 0, 3, 6, 9, 16, 19, 23, 26 and 29 are considered valid timestamp adjustment values as indicated in FIG. 3.

Knowing the operating frequency, and as such the cycle time, of the transmit gearbox 240, the timestamp adjustment value 247 can be used to dynamically adjust the timestamp of the input data 250. The timestamp of the input data block 250 will be reduced by an amount equal to the timestamp adjustment value 247 divided by the width of output data block 255, multiplied by the cycle time of the transmit gearbox 240. In an exemplary embodiment where the operating frequency is 515.625 MHz, the cycle time is equal to 1.939 ns. At this cycle time, the timestamp of the input data block 250 when the fourth output data block 255 is formed would be reduced by an amount equal to (6/20)*1.939 ns=0.5817 ns. As shown in FIG. 3, the timestamp adjustment values range from 0 to 18. As such, at a cycle time of 1.939 ns, the jitter associated with the transmit gearbox 240 can range from 0 ns to 1.745 ns [(18/20)*1.939 ns=1.745 ns]. In accordance with the system and method of the present invention, the jitter associated with the transmit gearbox 240 can be reduced from 1.939 ns down to 0.194 ns [1.939 ns-1.745 ns]. However, if the overall timestamp precision of the system is less than 0.194 ns, it will only be possible to reduce the jitter down to the lowest timestamp unit of the system.

In a particular embodiment, the internal delay monitor 245 can utilize a selector value 350 to identify the various alignments of the output data blocks relative to the input data blocks. Knowing the selector value 350 when each of the 66-bit input blocks is received at the gearbox 240 will enable the internal delay monitor 240 to assign a timestamp adjustment value 247 based on the selector value 350. In a particular embodiment, an internal lookup table that indicates timestamp adjustment values for different selector values 350 is used to assign the timestamp adjustment value 247. More particularly, to assign a timestamp adjustment value, the selector value 350 is determined. The corresponding timestamp adjustment value 247 in the lookup table is determined to be the assigned timestamp adjustment value 247.

Figure 4:
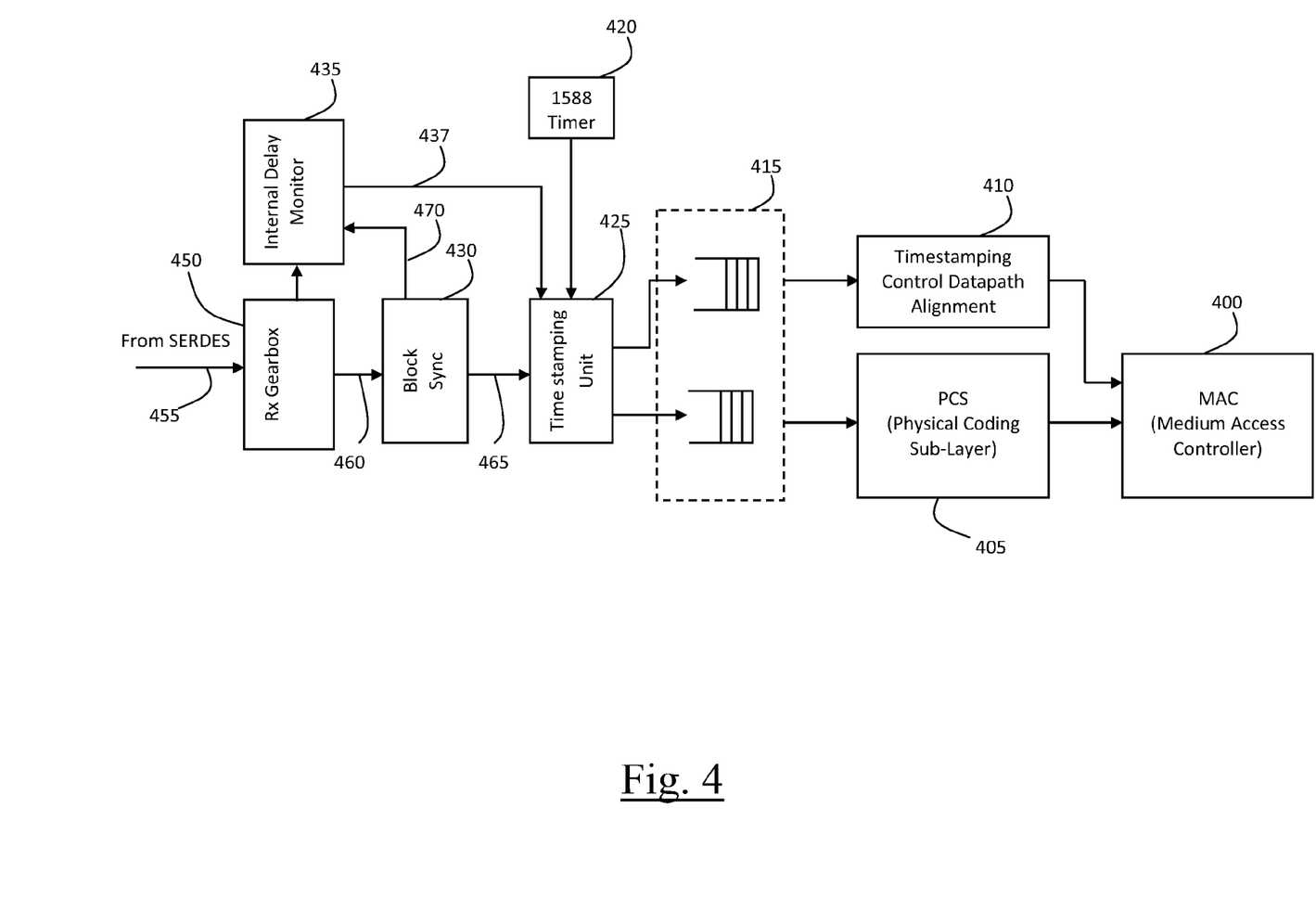
FIG. 4 is a block diagram of a receive gearbox in a SERDES system, in accordance with an embodiment of the present invention.

With reference to FIG. 4, in a particular embodiment of the present invention for receiving data at the SERDES interface, serial data is received at the SERDES circuitry and the data is then converted from serial data to 20-bit blocks of parallel data. The function of the receive gearbox 450 is to convert 20-bit wide data 455 originating from SERDES to 66-bit wide data 460 for transmission to the PCS of the network. The width of the parallel data is exemplary in nature and is not meant to limit the scope of the invention. Various other data widths are within the scope of the present invention. The 20-bit wide output data from the SERDES is received as input data 455 to the receive gearbox 450. The receive gearbox 450 processes the 20-bit wide input data and provides 66-bit wide output data to the PCS of the network. Although the receive gearbox 450 has converted the data to 66-bit wide output data, the beginning and end of the 66-bit word are unknown and the groupings are arbitrary. It is well known in the art to perform data alignment of the 66-bit unaligned data using well known data alignment techniques. In the present invention, to restore the alignment of the 66-bit wide output data 460, the 66-bit wide output data is processed through a block sync circuit 430 to establish the proper alignment of the data. The block sync circuit 430 receives the unaligned output data from the receive gearbox 450 and outputs aligned 66-bit wide output data. The block sync circuit 430 uses well known data alignment techniques to identify markers in the unaligned parallel output data which then allows the data to be aligned. The 66-bit wide output data from the block sync 430 is assigned a timestamp by the timestamping unit 425 based upon a system timer 420 for the circuit. The aligned data is then received at a Clock Domain Crossing (CDC) circuit 415 and subsequently transmitted to the PCS layer. In this embodiment, a timestamping control datapath alignment circuit 410 is used to identify a timestamp alignment for data transmitted from the plurality of registers. The timestamped 66-bit wide output data is then transmitted to the PCS 405 and to the MAC 400 as is commonly known in the art.

Figure 5:
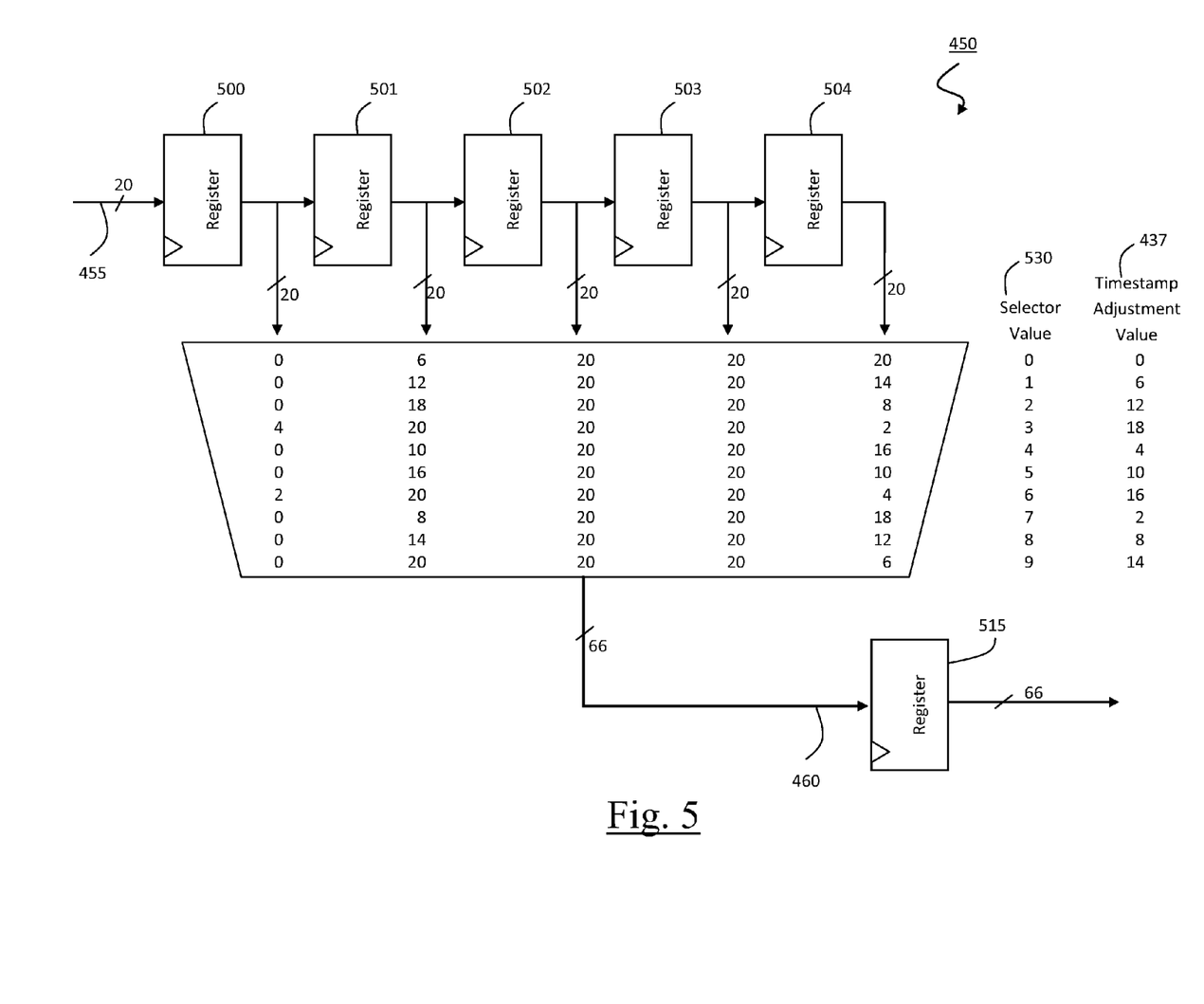
FIG. 5 is a block diagram illustrating the flow of data in a receive gearbox, in accordance with an embodiment of the present invention.

The internal operation of the receive gearbox 450 in the receive direction, where the input data 455 to the receive gearbox 450 is twenty bits wide while the desired output data 460 of the gearbox 450 is sixty-six bits wide is illustrated with reference to FIG. 5. As shown in FIG. 5, the 20-bit wide input data 455 from the SERDES circuit sequentially fills a series of registers 500-504 of the receive gearbox 450, where each input data block comprises 20-bits. At the output, 20-bit output data blocks 460 are read out from the receive gearbox 450. Thus, in a first cycle, twenty bits are read from register 504, twenty bits are read from register 503, twenty bits are read from register 502 and six bits are read from register 501. The bits from each of the registers are concatenated to generate a 66-bit wide output data block 460. The 66-bit wide output data is then processed through register 515 and delivered to the PCS of the network as required. After the first 66-bit wide output data block has been generated, there are fourteen bits remaining in register 501. These bits in the registers are then shifted forward through registers 502-504, such that fourteen bits are now in register 504 and registers 500-503 are repopulated with 20-bit input data blocks. Fourteen bits are then read from register 504, twenty bits are read from register 503, twenty bits are read from register 502 and twelve bits are read from register 501. The bits from each of the registers are concatenated to generate another 66-bit wide output data block 460. As shown in FIG. 5, this process continues until a complete block can be formed entirely from registers 500-504 with no remaining bits, and then the process repeats.

As shown in FIG. 4, in accordance with the Precision Time Protocol (PTP) the timestamping unit 425 assigns a timestamp to each of the blocks of 66-bit output data that are transmitted from the receive gearbox 450. Latency in inherently introduced by the receive gearbox 450. However, due to the internal operation of the receive gearbox 450, the latency introduced during the formation of the 66-bit output data from the 20-bit input data is not the same for every 66-bit output data block. In other words, the amount of time required for the receive gearbox 240 to produce each 66-bit output data block differs depending upon where in the 20-bit input block the 66-bit output data block is aligned. In this exemplary embodiment, wherein the receive gearbox 450 takes in 20-bit data blocks from the SERDES and delivers 66-bit data blocks to the PCS 405, the receive gearbox 450 will take in thirty-three 20-bit input data blocks for every ten 66-bit output data blocks read out. As such, that there will be ten different possible alignments of the first bit of a 66-bit output data block compared to the 20-bit input data received from the SERDES. The difference in latency for each of the various 66-bit output data blocks affects the precision of the timestamp. Knowing the alignment of the 66-bit output data relative to the 20-bit input data will allow a timestamp adjustment value 437 to be determined for each of the 66-bit output data blocks. This timestamp adjustment value 437 can then be used to adjust the timestamp of the 66-bit output data block. These ten different latencies through the receive gearbox 450 result in undesirable jitter in the system. The method of the present invention for dynamically adjusting the timestamp of the output data reduces the jitter introduced by the receive gearbox 450 into the system.

In accordance with the present invention, an internal delay monitor 435 is used to monitor the receive gearbox 450 and to identify the alignment of the 20-bit input data block within the 66-bit output data blocks and to assign a timestamp adjustment value 437 to the identified alignment. The timestamp adjustment value 437 is then transmitted to the timestamping unit 425 to allow for the dynamic adjustment of the timestamp of the output data 460. The dynamically adjusted timestamp can then be communicated to a processor in accordance with the Precision Time Protocol (PTP). The internal delay monitor 435 may be incorporated into the circuitry of the receive gearbox 450, or may be circuitry separate from, but in communication with, the receive gearbox 450.

In the exemplary embodiment illustrated in FIG. 5, the first 66-bit output data block 460 is assigned a timestamp adjustment value of zero because the alignment of the 66-bit output data 460 relative to the first 20-bit input data blocks in registers 500-504 is the earliest possible alignment in the block and is therefore assigned a timestamp adjustment value of zero. The second 66-bit output data block results from the fourteen bits that were remaining in register 501 that have been shifted to register 504, twenty bits from register 502, twenty bits from register 503 and twelve bits from register 501. As a result, the second 66-bit output data block 460 is assigned a timestamp adjustment value of six (twenty minus fourteen) based upon the alignment of the 66-bit output data block with the fourteenth bit of the 20-bit input data block from register 501.

Knowing the operating frequency, and as such the cycle time, of the receive gearbox 450, the timestamp adjustment value 437 can be used to dynamically adjust the timestamp assigned by the timestamping unit 425 to the 66-bit output data blocks 460. The timestamp to be assigned by the timestamping unit 425 to the 66-bit output data block would be reduced by an amount equal to the timestamp adjustment value 437 provided by the delay internal delay monitor 435 divided by the width of the input data block 455, multiplied by the cycle time of the receive gearbox 450. At an operating frequency of 515.625 MHz, the cycle time is equal to 1.939 ns. At this cycle time, the timestamp of the second 66-bit output data block 460 from the receive gearbox 450 would be reduced by an amount equal to (6/20)*1.939 ns=1.3573 ns. As shown in FIG. 5, the timestamp adjustment values range from 0 to 18. As such, in an exemplary embodiment, at a cycle time of 1.939 ns, the jitter associated with the receive gearbox 450 can range from 0 ns to 1.745 ns [(18/20)*1.939 ns=1.745 ns]. In accordance with the system and method of the present invention, the jitter associated with the receive gearbox 450 can be reduced from 1.939 ns down to 0.194 ns [1.939 ns−1.745 ns]. However, if the overall timestamp precision of the system is less than 0.194 ns, it will only be possible to reduce the jitter down to the lowest timestamp unit of the system.

In a particular embodiment, the internal delay monitor 435 can utilize a selector value 530 to identify the various alignments of the output data blocks relative to the input data blocks. Knowing the selector value 530 when each of the 20-bit input blocks is received at the gearbox 450 will enable the internal delay monitor 435 to assign a timestamp adjustment value 437 based on the selector value 530. In a particular embodiment, an internal lookup table that indicates timestamp adjustment values 437 for different selector values 530 is used to assign the timestamp adjustment value 437. More particularly, to assign a timestamp adjustment value, the selector value 530 is determined. The corresponding timestamp adjustment value 437 in the lookup table is determined to be the assigned timestamp adjustment value 437.

In the receive direction of the gearbox, in addition to reducing the jitter from the receive gearbox 450, the method of the present invention can also be used to reduce the jitter resulting from the block sync circuit 430. As previously described, the block sync circuit 430 is used to restore the alignment of the unaligned 66-bit wide output data 460 and to output aligned 66-bit wide output data 465. As such, within the block sync circuit 430, there can be sixty-six different latencies through the block sync circuit 430 depending upon the current block sync location when the unaligned 66-bit output data 460 enters the block sync circuit 430. In accordance with the present invention, the internal delay monitor 435 is used to identify the alignment of the unaligned 66-bit output data block when the unaligned 66-bit output data 460 enters the block sync circuit 430. The identified alignment can be used to assign an alignment adjustment value 470 to the aligned 66-bit output data 465 that is transmitted to the timestamping unit 425. Knowing the operating frequency of the block sync circuit 430, and the alignment adjustment value 470 identified by the internal delay monitor 435, the timestamp of the 66-bit output data can be dynamically adjusted. By dynamically adjusting the timestamp of the 66-bit output data based upon the identification of the alignment of the 66-bit output data block as it enters the block sync circuit 430, the jitter through the block sync circuit 430 will be removed and the precision of the timestamp will be improved. Once the proper alignment has been identified in the block sync circuit 430, the alignment adjustment value 470 will remain the same until the network link needs to be renegotiated.

Figure 6:
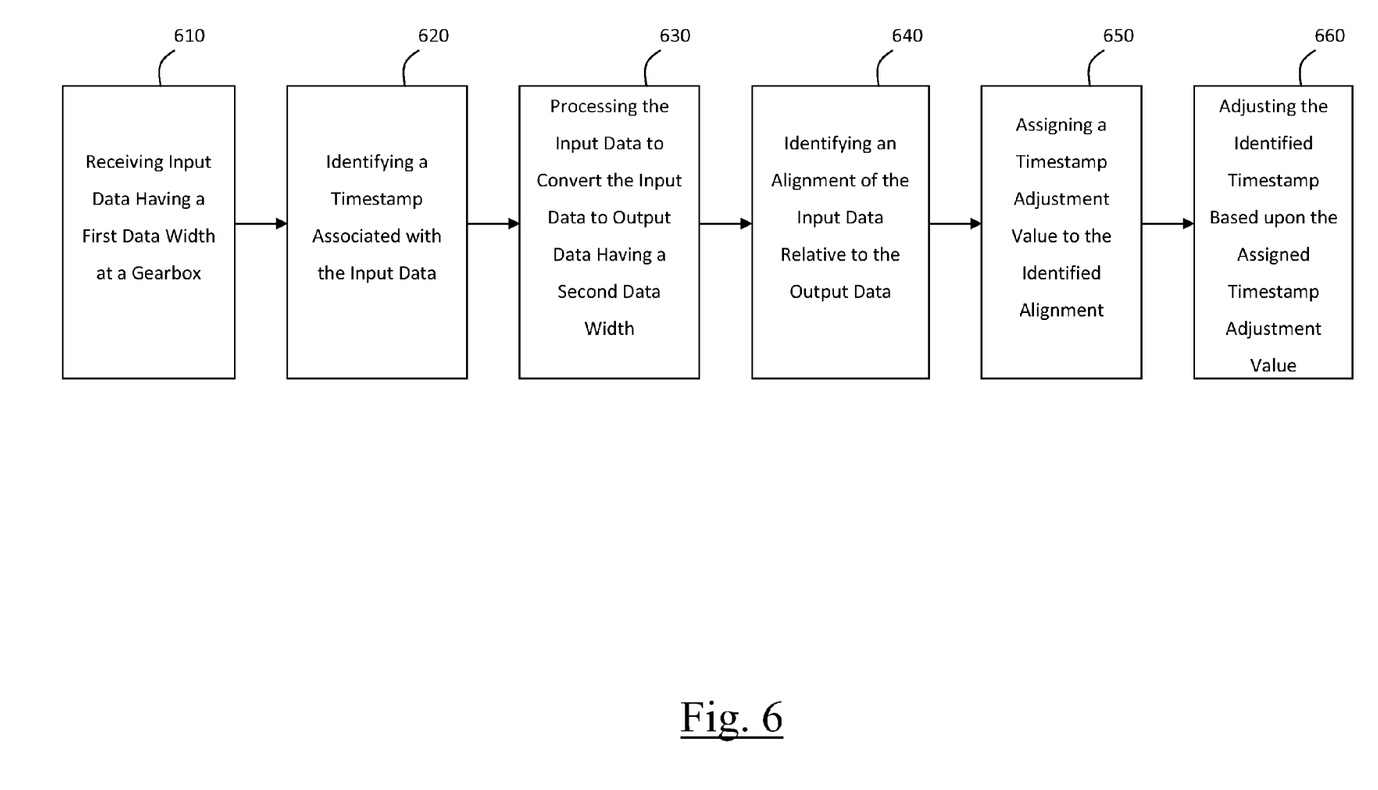
FIG. 6 is a flow diagram illustrating the method of the present invention in the transmit direction.
Figure 7:
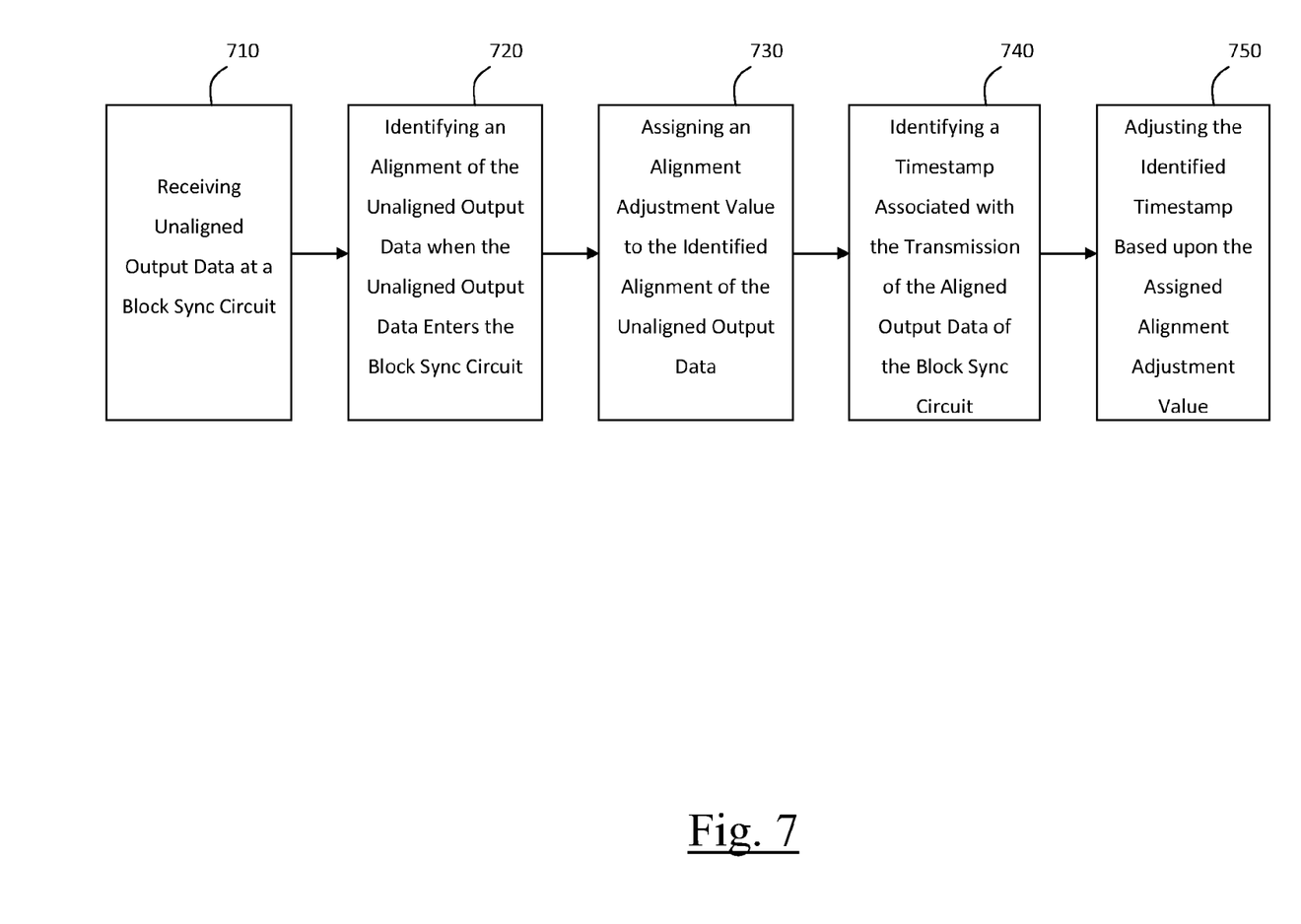
FIG. 7 is a flow diagram illustrating the method of the present invention in the receive direction.

As shown with reference to FIG. 6 and FIG. 7, the present invention provides a method for improving a timestamp precision in a precision timestamp protocol (PTP) device. In the transmit direction, as illustrated in FIG. 6, input data having a first data width is received at a gearbox 610. A timestamp associated with the input data is then identified 620. The input data is then processed through the gearbox to convert the received input data to output data, wherein the output data has a second data width different than the first data width 630. An alignment of the received input data relative to the output data within the gear box is identified 640. A timestamp adjustment value is then assigned to the identified alignment 650 and the identified timestamp is adjusted based upon the assigned timestamp adjustment value 660, thereby improving the timestamp precision in the PTP device. In the receive direction, as illustrated in FIG. 7, unaligned output data is received at a block sync circuit 710. An alignment of the unaligned output data when the unaligned output data enters the block sync circuit is identified 720. An alignment adjustment value is then assigned to the identified alignment of the unaligned output data 730. A timestamp associated with the transmission of the aligned output data of the block sync circuit is then identified 740 and the identified timestamp is adjusted based upon the assigned alignment adjustment value 750, thereby improving the timestamp precision in the PTP device.

The SERDES system and gearbox as described can be used in a wide variety of applications, including but not limited to, computer networking, data networking, instrumentation, video processing, and digital signal processing. In a particular embodiment, the system of the present invention could be implemented as a 10 Gigabit Ethernet link, however this not meant to be limiting and the invention can additionally be applied more broadly to similar technologies.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

The invention claimed is:

1. A method for improving a timestamp precision in a precision timestamp protocol (PTP) device, the method comprising:
   receiving, at a gearbox, an input data block comprising a plurality of data bits having a first data width;
   processing the input data block through the gearbox to convert the received input data block to an output data block, the output data block comprising a plurality of data bits having a second data width different than the first data width;
   identifying a timestamp associated with the processing of the input data block to the output data block through the gearbox;
   identifying a selector value associated with the input data having the first data width when the gearbox is a transmit gearbox or identifying a selector value associated with the output data having the second data width when the gearbox is a receive gearbox, the identified selector value indicating the alignment of the received input data block relative to a first data bit of the plurality of data bits of the output data block within the gearbox;
   assigning a timestamp adjustment value that corresponds to the identified selector value, wherein the assigned timestamp adjustment value is one of a plurality of different timestamp adjustment values, each of the timestamp adjustment values in the plurality of different timestamp adjustment values having a value that is representative of the amount of time required for the gearbox to convert the input data to the output data for the corresponding alignment and the corresponding selector value; and
   adjusting the identified timestamp based upon the assigned timestamp adjustment value to improve the timestamp precision in the PTP device.

2. The method of claim 1, wherein the second data width is wider than the first data width.

3. The method of claim 1, wherein the second data width is narrower than the first data width.

4. The method of claim 1, wherein adjusting the identified timestamp further comprises sending the assigned timestamp adjustment value to a timestamp adjustment circuit, the timestamp adjustment circuit operable to add or subtract the assigned timestamp adjustment value to the identified timestamp.

5. The method of claim 1, wherein assigning a timestamp adjustment value to the identified alignment further comprises accessing a lookup table to assign the timestamp adjustment value.

6. The method of claim 5, wherein the lookup table comprises a plurality of different timestamp adjustment values and corresponding selector values, the assigning the timestamp adjustment value further comprising accessing the lookup table using the identified selector value.

7. A method for improving a timestamp precision in a precision timestamp protocol (PTP) device, the method comprising:
   receiving, at a gearbox, an input data block comprising a plurality of data bits having a first data width;
   processing the input data block through the gearbox to convert the received input data block to an output data block, the output data block comprising a plurality of data bits having a second data width different than the first data width;
   identifying a timestamp associated with the processing of the input data block to the output data block through the gearbox;
   identifying a selector value associated with the input data having the first data width when the gearbox is a transmit gearbox or identifying a selector value associated with the output data having the second data width when the gearbox is a receive gearbox, the identified selector value indicating the alignment of the received input data block relative to a first data bit of the plurality of data bits of the output data block within the gearbox;
   assigning a timestamp adjustment value that corresponds to the identified selector value, wherein the assigned timestamp adjustment value is one of a plurality of different timestamp adjustment values, each of the timestamp adjustment values in the plurality of different timestamp adjustment values having a value that is representative of the amount of time required for the gearbox to convert the input data to the output data for the corresponding alignment and the corresponding selector value;
   sending an unaligned output data block to a block sync circuit;
   identifying an alignment of the unaligned output data block when the unaligned output data block enters the block sync circuit;
   assigning an alignment adjustment value to the identified alignment of the unaligned output data block, wherein the alignment adjustment value represents the amount of time required for the block sync circuit to convert the unaligned output data block to an aligned output data block at the block sync circuit; and
   adjusting the identified timestamp based upon the assigned alignment adjustment value and the assigned timestamp adjustment value to improve the timestamp precision in the PTP device.

8. The method of claim 7,
   wherein assigning a timestamp adjustment value to the identified alignment further comprises accessing a lookup table to assign the timestamp adjustment value.

9. The method of claim 7, further comprising a serial-deserializer (SERDES) device coupled to the gearbox.

10. A system to improve a timestamp precision in a precision time protocol (PTP) device, the system comprising:
    a gearbox comprising one or more registers and one or more multiplexers, the gearbox for receiving an input data block comprising a plurality of data bits having a first data width, for converting the input data block to an output data block comprising a plurality of data bits having a second data width, the second data width different than the first data width, and for identifying a timestamp associated with conversion of the input data block to the output data block; and an internal delay monitor coupled to the gearbox, the internal delay monitor comprising circuitry for identifying a selector value associated with the input data having the first data width when the gearbox is a transmit gearbox or identifying a selector value associated with the output data having the second data width when the gearbox is a receive gearbox, the identified selector value indicating the alignment of the received input data block relative to a first data bit of the plurality of data bits of the output data block within the gearbox, for assigning a timestamp adjustment value that corresponds to the identified selector value, and for adjusting the identified timestamp based upon the assigned timestamp adjustment value to improve the timestamp precision in the PTP device, wherein the assigned timestamp adjustment value is one of a plurality of different timestamp adjustment values, each of the timestamp adjustment values in the plurality of different timestamp adjustment values having a value that is representative of the amount of time required for the gearbox to convert the input data to the output data for the corresponding alignment and the corresponding selector value.

11. The system of claim 10, wherein the second data width is wider than the first data width.

12. The system of claim 10, wherein the second data width is narrower than the first data width.

13. The system of claim 10, wherein the internal delay monitor further comprises a lookup table, the lookup table to assign the timestamp adjustment value.

14. The system of claim 10, wherein the output data block is an unaligned output data block, the system further comprising a block sync circuit coupled to receive the unaligned output data block and to align the unaligned output data block, the internal delay monitor further comprising circuitry for identifying an alignment of the unaligned output data block when the unaligned output data block enters the block sync circuit, for assigning an alignment adjustment value to the identified alignment of the unaligned output data block and for adjusting the identified timestamp based upon the assigned alignment adjustment value to improve the timestamp precision in the PTP device.

15. The system of claim 10, further comprising a timestamping unit in communication with the internal delay monitor and the gearbox.

16. The system of claim 10, further comprising a serial-deserializer (SERDES) device coupled to the gearbox.

* * * * *